US009881323B1

(12) United States Patent
Agronow et al.

(10) Patent No.: US 9,881,323 B1
(45) Date of Patent: Jan. 30, 2018

(54) PROVIDING HARD-TO-BLOCK ADVERTISEMENTS FOR DISPLAY ON A WEBPAGE

(75) Inventors: Dan Agronow, Douglasville, GA (US); Lori Lodwick, Decatur, GA (US); Tom Cona, Athens, GA (US)

(73) Assignee: TWC PATENT TRUST LLT, Burlington, VT (US)

( * ) Notice: Subject to any disclaimer, the term of this patent is extended or adjusted under 35 U.S.C. 154(b) by 2039 days.

(21) Appl. No.: 11/821,171

(22) Filed: Jun. 22, 2007

(51) Int. Cl.
G06Q 30/00 (2012.01)
G06Q 30/02 (2012.01)

(52) U.S. Cl.
CPC .................. G06Q 30/0277 (2013.01)

(58) Field of Classification Search
USPC ........................................ 705/14, 10, 26, 27
See application file for complete search history.

(56) References Cited

U.S. PATENT DOCUMENTS

| | | | | | |
|---|---|---|---|---|---|
| 6,011,537 | A * | 1/2000 | Slotznick | ....................... | 715/733 |
| 7,234,158 | B1 * | 6/2007 | Guo | ..................... | H04L 63/0815 709/229 |
| 7,529,835 | B1 * | 5/2009 | Agronow | .......... | G06F 17/30902 709/203 |
| 2002/0113815 | A1 * | 8/2002 | DeGross | ................ | G06Q 30/02 715/733 |
| 2002/0194590 | A1 * | 12/2002 | Pong | ...................... | H04N 7/165 725/32 |
| 2003/0123465 | A1 * | 7/2003 | Donahue | ................. | H04L 45/02 370/401 |
| 2004/0168121 | A1 * | 8/2004 | Matz | ................. | G06F 17/30867 715/255 |
| 2004/0213542 | A1 * | 10/2004 | Hamasaka | .............. | G11B 27/11 386/230 |
| 2005/0071745 | A1 * | 3/2005 | Ehrich | .................... | H04L 67/02 715/200 |
| 2005/0096980 | A1 * | 5/2005 | Koningstein | .......... | G06Q 30/00 705/14.41 |
| 2005/0137958 | A1 * | 6/2005 | Huber | .................... | G06Q 30/02 705/37 |
| 2005/0198315 | A1 * | 9/2005 | Wesley | .................. | G06Q 30/02 709/228 |
| 2005/0216342 | A1 * | 9/2005 | Ashbaugh | ............. | G06F 17/211 705/14.4 |
| 2006/0130119 | A1 * | 6/2006 | Candelore | .............. | H04N 7/163 725/135 |
| 2007/0061202 | A1 * | 3/2007 | Ellis | ....................... | G06Q 30/02 705/14.61 |
| 2007/0300152 | A1 * | 12/2007 | Baugher | ............. | G06F 17/3089 715/210 |
| 2008/0127247 | A1 * | 5/2008 | Allen | ..................... | H04N 7/163 725/32 |

(Continued)

OTHER PUBLICATIONS www.techdict.org/define/web+page updated Mar. 21, 1999.*

*Primary Examiner* — Luis A Brown
(74) *Attorney, Agent, or Firm* — Muenier Carlin & Curfman LLC

(57) ABSTRACT

Methods and systems of the invention provide advertisements or other content for a webpage. An example is providing portions of an advertisement as separate items in multiple formats, multiple positions, and/or from multiple locations so that at least some of the advertisement is still displayed to a requesting user even though advertisement-blocking mechanisms are used.

22 Claims, 5 Drawing Sheets

(56) References Cited

U.S. PATENT DOCUMENTS

| | | | |
|---|---|---|---|
| 2008/0183577 A1* | 7/2008 | Evans | G06Q 30/02 705/14.69 |
| 2008/0222245 A1* | 9/2008 | Janakiraman | G06Q 30/02 709/203 |
| 2008/0222503 A1* | 9/2008 | Sandige | G06T 15/04 715/201 |
| 2008/0228572 A1* | 9/2008 | Teterin | G06Q 30/02 705/14.64 |
| 2008/0263143 A1* | 10/2008 | Takahashi | G06Q 30/02 709/203 |
| 2008/0281627 A1* | 11/2008 | Chang | G06Q 10/06375 705/7.39 |
| 2009/0030802 A1* | 1/2009 | Plotnick | G06Q 30/0258 705/14.56 |
| 2009/0132363 A1* | 5/2009 | Powell | G06Q 30/02 705/14.69 |
| 2010/0023387 A1* | 1/2010 | Pan | G06Q 30/02 705/14.4 |

* cited by examiner

PROVIDING HARD-TO-BLOCK ADVERTISEMENTS FOR DISPLAY ON A WEBPAGE

RELATED FIELDS

The invention relates to providing an advertisement or other content for a webpage, and more specifically, relates to providing different portions of an advertisement as separate items in multiple formats, multiple positions, and/or from multiple storage locations so that at least some of the advertisement is still displayed to a requesting user even though advertisement-blocking mechanisms are used.

BACKGROUND

A webpage is a collection of one or more items available on the World Wide Web that can be displayed using a web browser. A webpage is typically defined or specified by one or more files of information, usually in HTML, XHTML, and other browser-compatible formats. A web browser retrieves a webpage file (e.g., HTML) from a local computer or a remote web server (e.g., a server that serves the HTML using HTTP). The retrieved webpage file (e.g., the HTML) may consist of static text or dynamically created text and typically provides information usable by the web browser, including (a) information about the format of the displayed webpage, (b) items to be displayed on the webpage (e.g., text to be displayed), and/or (c) the location of additional items to be retrieved and then displayed on the webpage (e.g., locations of image files stored on another computer to be displayed).

Displaying a webpage can thus involve displaying static and/or dynamic information from one or multiple locations. Often, a webpage includes displayed non-advertisement-content items from one or more locations and advertisement-content items, which are usually graphics, from one or more other storage locations (e.g., in a separate domain). Various techniques are used to block some or all of the advertisement-content items. Some ad-blocking software keeps track of locations (e.g., domains) containing advertisements and simply does not display (or allow download and/or display of) items from the locations when displaying webpages. Some software blocks advertisements based on source URL. For example, an advertisement image may be stored as file Ad1.gif at a location accessible with the URL company.org/Ads/Product1/Ad1.gif. Ad-blocking software may prevent the display of files from associated URLs (e.g., based on the folder structure of the URL). Depending on the level of exclusion desired, the software may prevent the display of any file (or file type, e.g., image file) from an appropriate folder, where the "*" indicates a wildcard for all content in that folder (i.e., all content having that same beginning URL portion):

company.org/Ads/Product1/*
company.org/Ads/*
company.org/*

With one of these ad-blocks in place, a web browser will not display the image from a file whose URL is prohibited.

FIG. 1 illustrates a traditional webpage display 100 with advertisements 110, 120, 130 displayed. FIG. 2 illustrates the same webpage as FIG. 1 with advertisements blocked. Depending on the webpage files, items may change position upon the removal of advertisement items. In the example depicted in FIGS. 1 and 2, the non-advertisement item 140 moves up to use the space that was intended for several of the advertisement items 120, 130. The end user sees nothing about the advertisements 110, 120, 130 that were removed.

Webpage providers desire to prevent having items (advertisement-content or not) blocked for many reasons, including avoiding the loss of revenue from blocked advertisement-content and avoiding the unsightly (or at least unintended) item arrangement often caused when blocked items are not displayed. There is a need for improved techniques for providing content, such as advertisement-content, to improve the appearance of its display and likelihood that at least some of the content will display without being entirely blocked.

SUMMARY

Methods and systems of the invention provide content, such as an advertisement, as separate items in multiple formats, multiple positions, and/or from multiple storage locations so that at least some of the content is still displayed to a requesting user even though blocking mechanisms are used. Embodiments may involve providing content-associated items for display that are stored at one or multiple locations (e.g., domains) and in one or multiple formats (e.g., image, text, .gif, .jpg, etc.). A webpage file may specify such items and/or their storage locations.

Certain embodiments of the invention provide a webpage file specifying the display of items on the webpage in adjacent or overlapping positions. For example, the display positions of a first item and a second item may be such that (i) if both items are displayed, then the first item is visible and the second item is hidden, partially hidden, or entirely visible and (ii) if the first item is not displayed (i.e., blocked), then the second item is displayed and is visible.

Certain embodiments may involve a method of providing an advertisement on a webpage involving selecting multiple items of different formats at different locations for display as a single advertisement. The items may share one or more common display attributes that enhance a single-advertisement appearance of the combined advertisement display items. Examples of such common display attributes include common colors, common words, common geometric shapes, common border shapes, and shared borders.

BRIEF DESCRIPTION OF FIGURES

FIG. 4 illustrates a webpage according to certain embodiments of the present invention.

FIG. 5 illustrates the webpage of FIG. 5 with advertisements blocked.

DETAILED DESCRIPTION OF FIGURES

The following detailed description describes specific embodiments of the invention in the context of items of advertising and non-advertising content displayed on webpages made available on the world wide web. The invention is not limited to any particular type of network or data. Those of ordinary skill in the art will understand that the invention has broader applications, for example, in television, radio, and other media.

Figure 1:
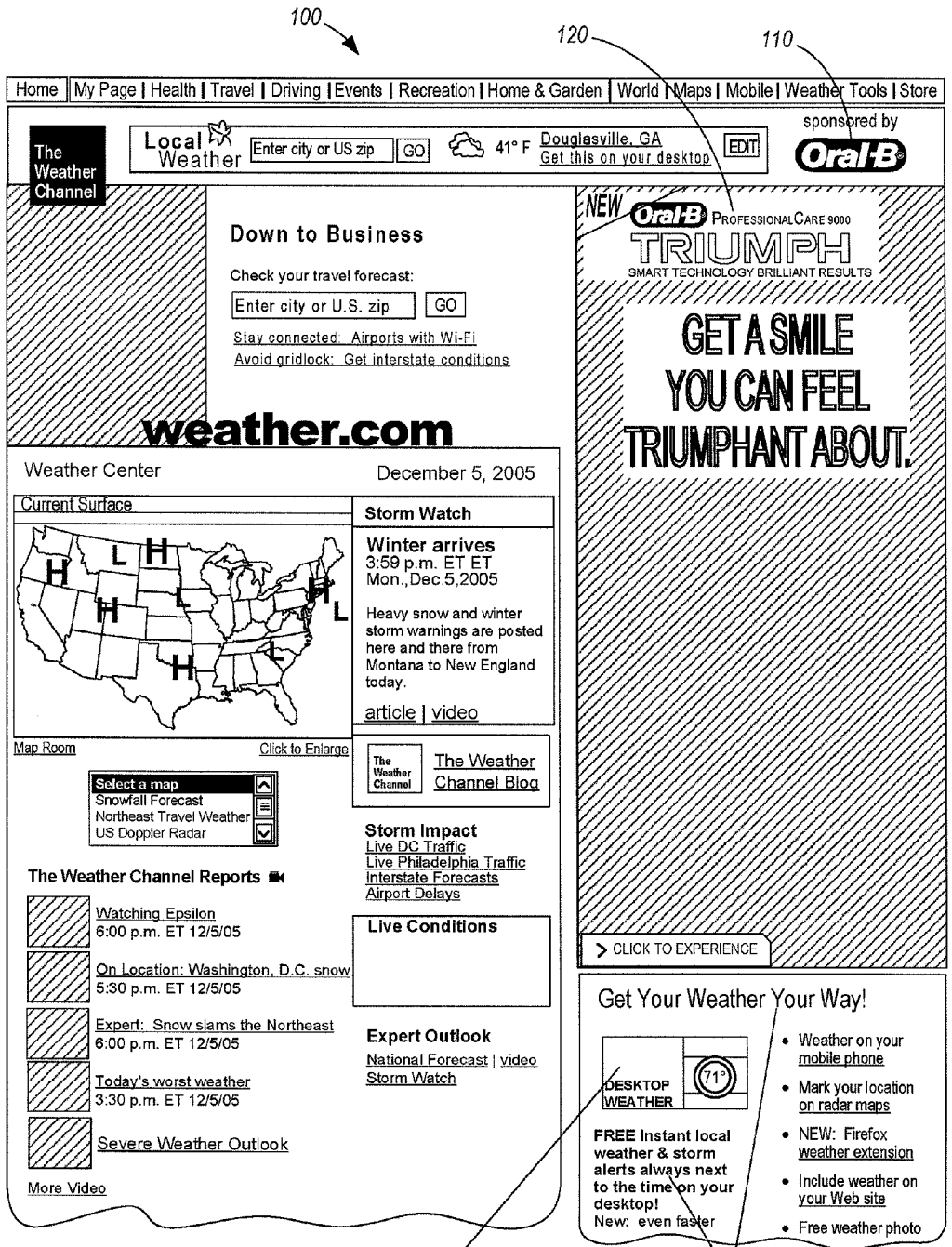
FIG. 1 illustrates a traditional webpage including advertisements.
Figure 2:
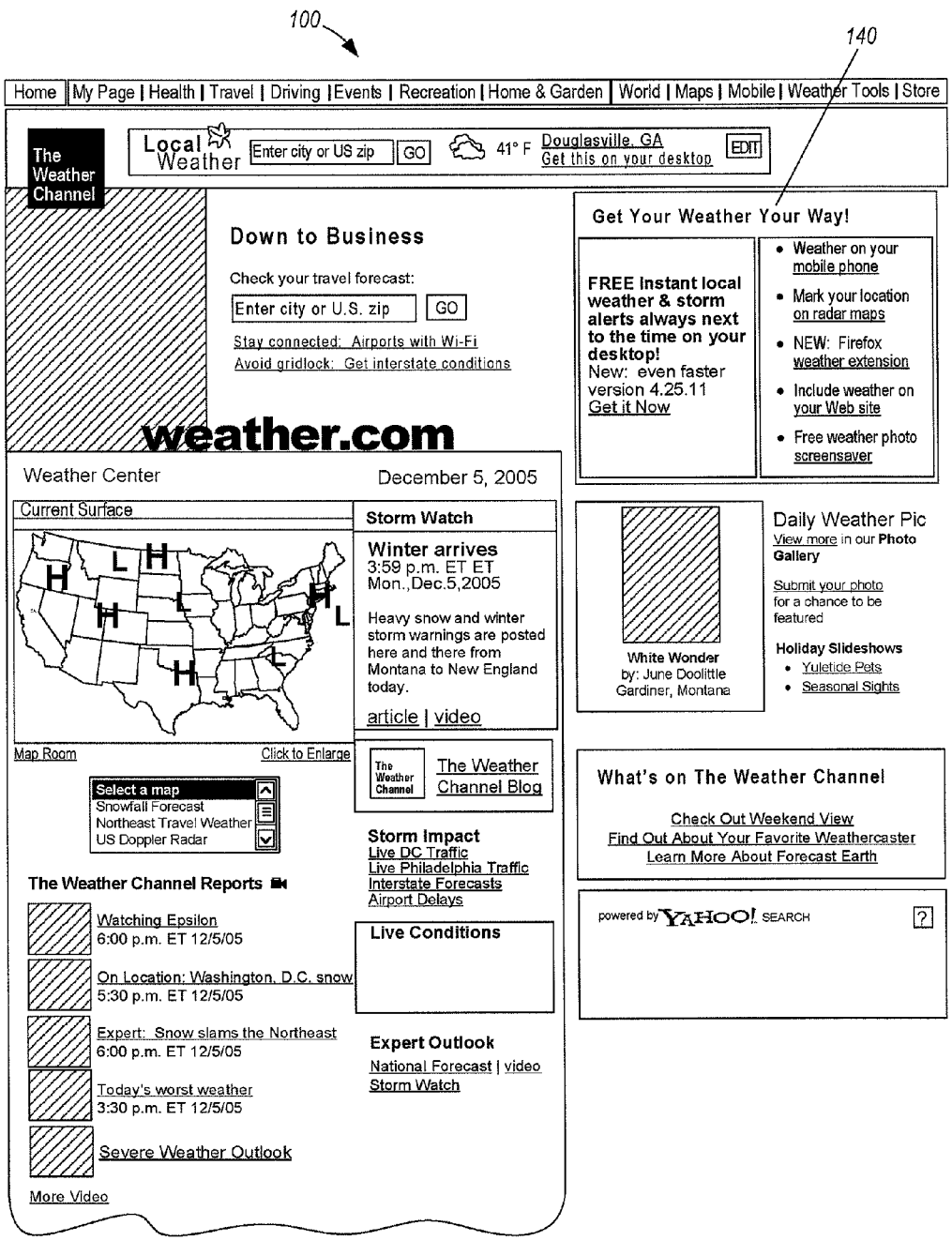
FIG. 2 illustrates the traditional webpage of FIG. 1 with advertisements blocked.
Figure 3:
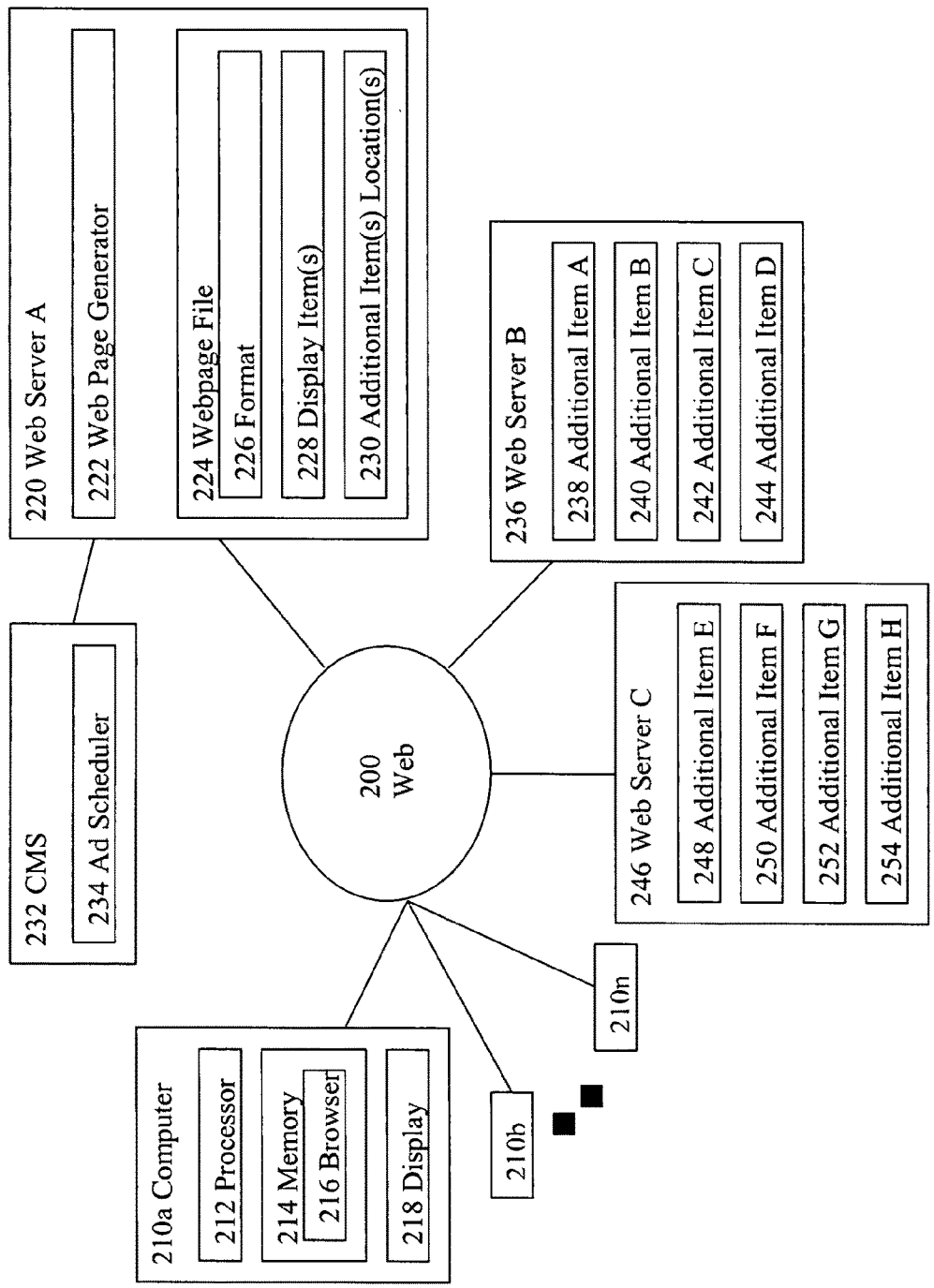
FIG. 3 illustrates a system according to certain embodiments of the present invention.

Referring now to FIG. 3 illustrating exemplary components of systems and methods of certain embodiments of the invention. The World Wide Web 200, which may include the Internet, private networks, and/or any other suitable network or information route, connects web browsing computers 210a-n to webpages available on the web 200. A browsing computer 210a connected or connectable to the web 200 may, for example, include a processor 212, memory 214, which may contain a web browser software application 216, and a display 218 for displaying webpages. A browsing computer 210a may include other suitable components in addition to or in place of those described above.

A browsing computer 210a may, as in an example of a webpage request, request a webpage through web 200 from web server A, 220. A web server may provide a static page and/or may, as shown in FIG. 3's web server A 220, include a web page generator 222 for dynamically generating a webpage file 224, including one or more of format information 226, items to display 228, and information about the location of (or other suitable reference to) additional items to display 230. A webpage file may be in any suitable file format, including but not limited to, the HTML and XHTML formats.

A web page generator 222 may utilize a Content Management System (CMS) 232 in dynamically generating a web page file. The CMS may select content and/or format for the webpage based on, for example, content rules, available content, information about or from the requestor or requested webpage, and any other suitable consideration. For example, a CMS may contain or otherwise utilize an Ad Scheduler 234 that selects one of several potential advertisements for inclusion in a dynamically generated webpage file 224. As further examples, an Ad Scheduler 234 may advance through a queue of different advertisements items for inclusion on the webpage in response to successive requests or may provide an advertisement that is selected based on some other scheme, rule, requirement, or information. An Ad Scheduler may or may not be physically located with the CMS, which itself may or may not be physically located with the requesting web server's 220 webpage generator 222.

A CMS and/or Ad Scheduler 234 may determine separate items associated with a single advertisement, determine which items are located at different storage locations, e.g., on different servers, and/or determine which items have different formats. Such determinations may be used to select appropriate items in accordance with aspects of the invention.

Generally, the CMS system will track available content for potential inclusion on a webpage, including web items A-D 238, 240, 242, 244 associated with web server B 236 and items E-H 248, 250, 252, 254 associated with web sever C 246. As an example, when a web page generator 222 requests identification of two items for inclusion on a webpage that is being generated, the CMS may select item A 238 on web server B 236 and item G 252 on web server C 246. The CMS passes information about the location (or other referencing information) for the selected items 238, 252 back to the requesting web page generator 222 on web server A 220 for inclusion in the dynamic web page being generated 224 as additional item location information 230.

The CMS may also select text for a text item to be included in the generated web page file 224 itself as a display item 228. The selection of one or more items for inclusion in a given webpage may be based on other selected items. For example, the CMS could select additional item 238, determine the content of that item (e.g., that it relates to a "Thrifty" rental car advertisement), and select a text item for inclusion in the same web page that also relates to that advertisement (e.g., "Get a rate/reserve a car"). In short, the CMS can be used to determine, select, or otherwise associate items having related content for a web page. Other components also may be used for this and related functions.

A CMS may be capable of changing the content that will be passed to a web page generator based on the data that will be part of the page. For example, a CMS may pass content related links or images based on temperature data. Specifically, a CMS could retrieve temperature information from a database and apply rules or other criteria so that if the temperature is above 90 degrees, it selects certain content, e.g., links or images to swimming pools, beach web cams, or beach videos. Thus, webpage content passed by the CMS to the page generator may be different based on a variety of factors, weather data, time of day, day of week, season, etc. Additionally, a CMS may be capable of passing similar information to an Ad Scheduler to help it select the most appropriate advertisement. For example, information reflecting that the temperature is above 90 degree may be passed to the Ad Scheduler so that it selects the appropriate advertisement based on that data and its queue of Ads, e.g., a beach towel sale at Wal-Mart® stores versus a Ski sale at Sports Authority® stores. Generally, specific content and advertisements may be selected for a webpage based on the general content of the webpage, separately retrieved data, the user, and any other suitable characteristic.

A CMS may also be capable of communicating with the Ad Scheduler to ensure that advertisement dimensions and content are otherwise appropriate for the content and web page being built. In embodiments where they are separate components, the CMS and Ad Scheduler may communicate or otherwise coordinate to determine the display position on a webpage. In certain embodiments, one or more advertisement positions are communicated to an Ad Scheduler, e.g., a CMS may contact an Ad Scheduler and identify a home page, that the page has three Ad positions: Ad_Position X1 (defined to be a specific type—banner and a specific size—250 pixels by 300 pixels), Ad_Position Y6 (which again represents specific information defined) and Ad_Position Z18. The defined information may be provided by the CMS or known to the Ad Scheduler. The CMS may also send other information about the web page. In response, the Ad Scheduler will return information to the CMS to define which specific advertisements (e.g., images, links, text, etc.) should be displayed in those requested advertisement positions.

In certain embodiments, the programming logic of a CMS is implemented as part of a web application development process. A CMS could be a Web application or a static web page with programmed logic that dynamically changes the page such as a simple HTML webpage with logic to change the background of the page to blue on certain days of the week. Generally, any programmed logic that can dynamically or otherwise change the look, content or layout of a web page can be considered a type of CMS. Even a simple CMS, such as the webpage just mentioned, could determine an appropriate advertisement or call an Ad Scheduler to request an advertisement with the criteria that the advertisement coordinate with a blue background.

In certain embodiments, the rules for an Ad Scheduler are provided by an Ad Specialist that enters scheduling guidelines based on client requests. Accordingly, certain aspects of the invention allow a web page publisher to generate revenue by combining purchased content (e.g., ski lift information purchased from a separate content provider) with an advertisement provided by a client.

The CMS 232 and/or the web page generator 222 may be used to select content, such as advertisement-content, as separate items in multiple formats, multiple display positions, and/or from multiple storage locations so that at least some of the advertisement is still displayed to a requesting user even though advertisement-blocking mechanisms are used. Such selected content may be specified in display positions or locations to plan for the appearance of the content's display on a webpage both when one or more items are blocked and when no items are blocked. Items for display (e.g., display items 228, and additional items A-H 238, 240, 242, 244, 248, 250, 252, 254 may by stored at one or multiple locations (e.g., web server A 220, web server B 236, and web server C 246) and in one or multiple formats (e.g., image, text, .gif, .jpg, etc.). The CMS 232 and the web page generator 222 may be used to associate items based on content (e.g., for a common advertisement) for inclusion in a webpage. For example, a CMS may contain lists, database entries, or keywords associated with items that are used to select items associated with a given advertisement.

Other ways for a CMS to associate items based on content will be apparent to those of skill in the art. Generally, there are many things a CMS could consider in its logic to build a page, including but not limited to, the type of browser, type of platform (PC, Mobile), screen size, monitor resolution, etc. A CMS could consider any part of the data that would be part of the content and/or the user preferences, e.g. those stored in a browser cookie. A CMS could also build pages differently based on its programmed logic, for example, every 5$^{th}$ user gets the page with a red background, while everyone else gets a white background.

The selection of items are, in certain embodiments, reflected in the generated webpage file 224 as, for example, a display item 228 or additional item location 230, while the display format (e.g., placement) are reflected in the webpage file's format information 226. Some format information may be reflected in the generated webpage file 224 item information 228, 230 and/or may be reflected in the additional items A-H 238, 240, 242, 244, 248, 250, 252, 254, themselves.

Certain embodiments of the invention involve generating a webpage file by selecting a first and a second advertisement item for display on the webpage, wherein the first and second items are selected based on both being associated with the same advertisement, with the first item stored on a first server and the second item stored on a second server different from the first server, and wherein the generated webpage file specifies the first and second items by including within the webpage file either the item itself or the server location the item.

Using separate items associated with the same content but stored at different server locations may improve the chances that at least some of the advertisement content will be displayed to a requesting user even though advertisement-blocking mechanisms are used. For example, display item 228 of the webpage file and additional item 238, which could be specified for display on the webpage with the use of an <image> HTML tag in additional item location 230, could be associated with the same advertisement content. If advertisement blocking mechanisms are used to block content from web server B 236 (including additional item A 238), the display item 228 will still be displayed.

The invention described herein can involve a variety of forms including software, applications, and data or instructions stored on a computer readable medium. As examples, with respect to FIG. 3, the web page generator 222, CMS 232, and ad scheduler 234 could be implemented as instructions stored on a computer readable medium that are executable by one or more computer processors. As additional examples, web page file 224 and additional items A-H could be stored as data in any suitable format (e.g. .gif, txt., .jpg, .mp3, .mvr., etc.) in data files on a computer readable medium.

According to certain embodiments, the webpage file 224 specifies the display of items in adjacent or overlapping positions. Such positioning may allow a webpage to have a substantially similar (or otherwise acceptable) appearance both when no advertisement content is blocked and when some or all of the advertisement content is blocked. For example, the display positions of a first item and a second item may be such that (i) if both items are available for display (i.e., not blocked), then the first item is visible and the second item is hidden, partially hidden, or entirely visible and (ii) if the first item is not displayed, then the second item is displayed and is visible. As a specific example, if the first item entirely overlaps the second item, only the first item will display when the first item is not blocked and the second item will be hidden, but only the second item will display when the first item is blocked. If the first item and second item have the same or substantially similar display sizes and shapes then the appearance of the display will not substantially change regardless of whether the first item is blocked or not.

Figure 4:
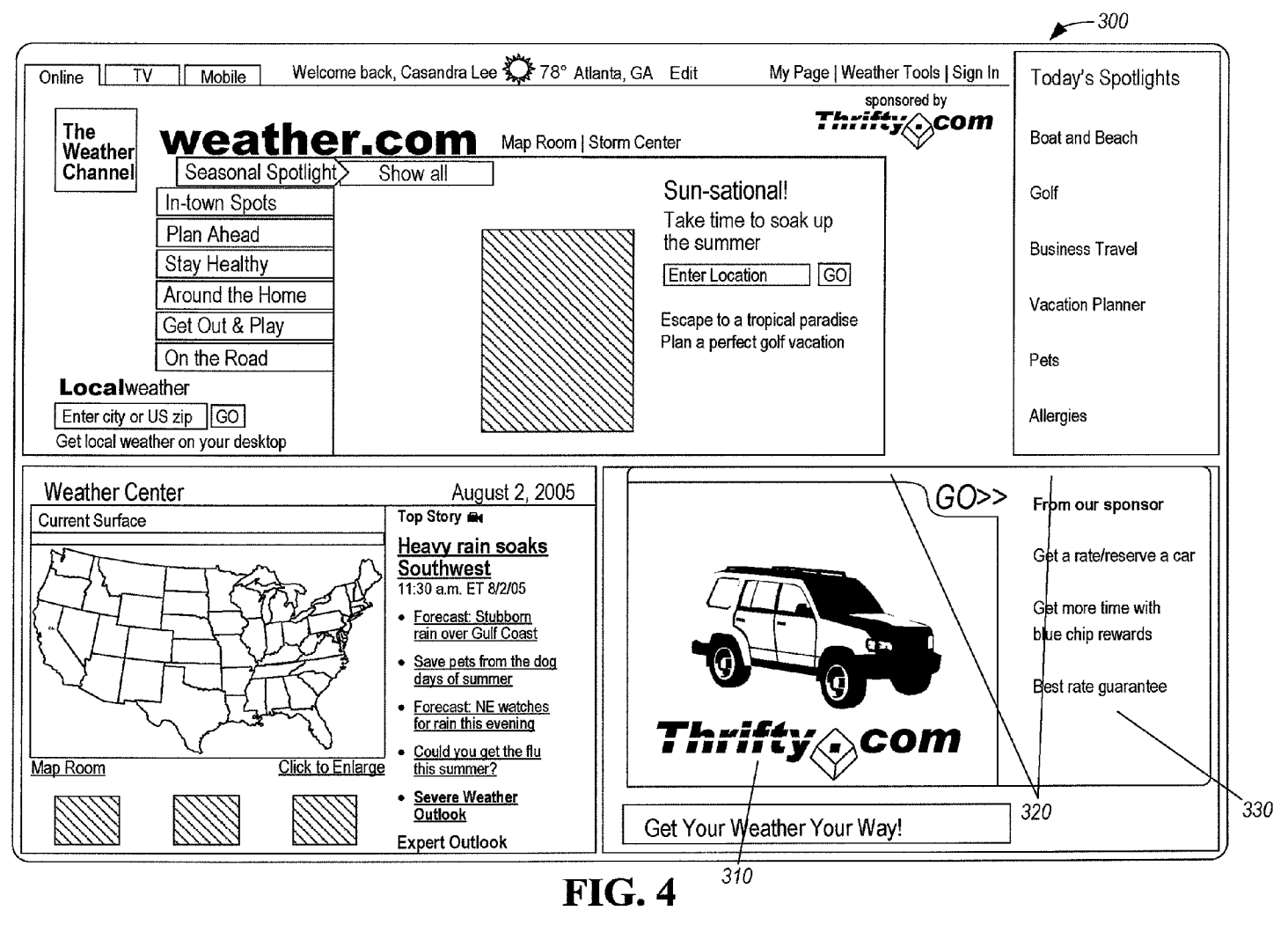

As another example, as illustrated in FIG. 4, an image item 310 is displayed adjacent to a text item 330. A webpage file (such as the webpage file 224 of FIG. 3) could specify the text item 330 (e.g., FIG. 3's display text 228 in the webpage file 224), a reference to the storage location of the image file producing image 310 (e.g., FIG. 3's additional item location 230 referencing, for example, the location of additional item A 238), and the adjacent display locations and other format aspects of the items (e.g., FIG. 3's format information 226). A webpage file may specify location and item information in any suitable way in accordance with the general principles of the invention and/or additional ways known to those of skill in the art.

Certain embodiments may provide content, such as an advertisement, on a webpage in different formats and/or display locations for display as a single advertisement. FIG. 4 illustrates a webpage display 300 including displayed image item 310 and a displayed text item 330 that both relate to the same content ("Thrifty.com" car rental) and that are displayed adjacent to one another as a single advertisement. The items may share one or more common display attributes that improve the single-advertisement appearance of the combined advertisement display items. One example of a common display attribute is a common border color such as the single color used for the common top border 320 in both items 310 and 330. Other examples of such common display attributes include common colors, common words, common geometric shapes, common border shapes, and shared borders.

Figure 5:
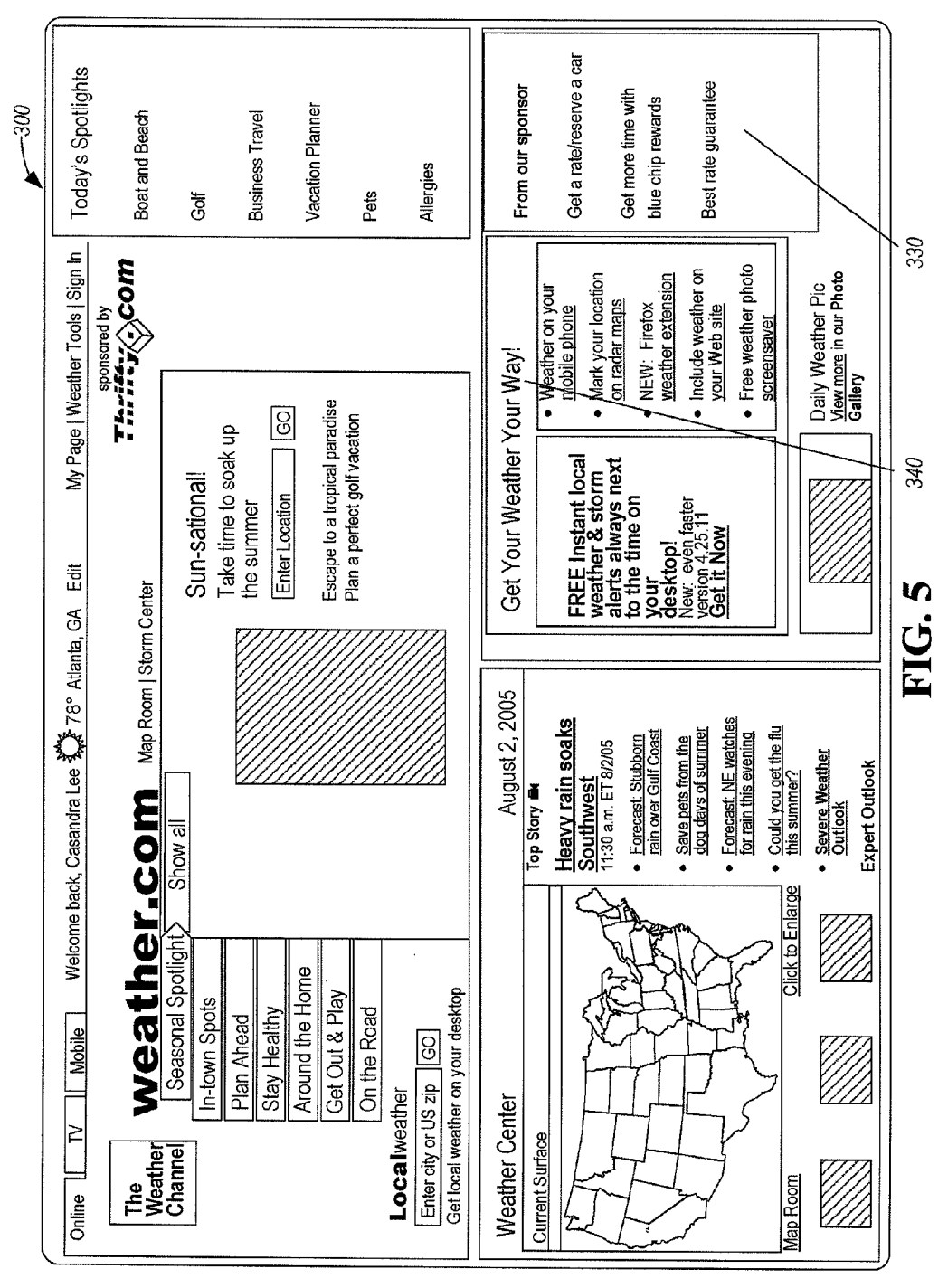

FIG. 5 illustrates the webpage of FIG. 4 with certain items blocked. For example, if an adblock software program had blocked all content from FIG. 3's Web Server B 236 preventing additional item A 236 from being used, the display 300 in FIG. 4 will not include the image 310 associated with that item 236. However, because text 330 comes from a different source (e.g., web server A's webpage file's 224 display item 228) it still displays. Accordingly, providing items related to the same content from different sources and/or in different formats improves the chances that at least one of such items will be displayed. In the case of FIG. 5, even though item 310 is blocked, item 330 is still displayed.

The items of different formats and/or from different locations may partially or entirely overlap one another so that when an item is not blocked, the other item (e.g., a text item) is covered (i.e., not visible) by the first item (e.g., an image item). This is generally because while images can be blocked with relative ease based on URLs, text from a CMS is not as easily blocked.

Spacing of display items may be controlled by the CMS, which may specify or otherwise control the location, size, and relationship of items displayed on the webpage.

Certain embodiments of the invention further provide the ability to provide rewards (e.g., coupons) available only to those who do not have content-blocking software. For example, such a reward could be displayed only in the part of the advertisement subject to most likely blocking.

Certain embodiments of the invention further ensure that content is displayed in a useful or otherwise intended manner or not displayed at all. An example is provided by the use of blockable content (e.g., a separate graphics file) that overlaps hard-to-block content (e.g., the content is from the CMS in the webpage file). In the event that content is blocked, the webpage retains its intended look and feel. In the event that the hard-to-block content is blocked, then no webpage is provided at all. As a specific example, by having a text Ad from the CMS under the display Ad from the Ad Scheduler the space won't collapse up or cause the page to shift around because the space for the Ad was already populated by the CMS.

Modifications, additions and deletions may be made to the embodiments described above and shown in the accompanying figures without departing from the scope or spirit of the present invention. For example, while the invention has been discussed in the context of storage-location-based-content-blocking, other blocking methods may be addressed using the principles of the present invention. For example, file-type-based-content-blocking (i.e., that blocks all images) can be dealt with by providing related content in both image and one or more other formats. As another example, local-only-content-blocking (i.e., displaying only items from a webpage file and no referenced items) can be addressed according to the principles of the present invention by providing content within the webpage file that is related to the content of items referenced for display, but not included, in that file. In short, the general principles of providing related content in different forms, storage locations, display positions, and ways can address a variety of present and yet-to-be-developed content-blocking techniques.

The invention claimed is:

1. A method of providing an advertisement for display on a webpage comprising:
   receiving a request at a web server for a webpage from a requesting web browser;
   generating a webpage file, by a content management system executing on a computing device, by selecting a first and a second advertisement item for display on the webpage, wherein the first and second items are selected based on both being associated with the same advertisement, with the first item stored on a first server and the second item stored on a second server different from the first server, wherein the generated webpage file specifies the first and second items by including within the webpage file: (a) either the first item or the location of the first item at the first server; and (b) either the second item or the location of the second item at the second server, and wherein information in the webpage file specifies that the first and the second items are to be displayed in overlapping display positions on a webpage, such that the webpage has a similar formatting when the first and the second items are displayed and when one of the first and the second items are blocked by an ad-blocking application;
   providing, to the requesting web browser, the webpage file and the first and second advertisement items such that the requesting web browser displays the webpage with one of the first and second advertisement items when the other of the first and second advertisement items is blocked by the ad-blocking application, wherein the overlapping display positions of the first and second advertisement items specified in the webpage file results in a display of the webpage having the similar formatting as if the other of the first and second advertisement items was not blocked by the ad-blocking application.

2. The method of claim 1, wherein the first and second items have different formats.

3. The method of claim 2, wherein the first item has an image format and the second item has a non-image format.

4. The method of claim 1, wherein selecting the first and second items is further based on the first and second items having different formats.

5. The method of claim 1, wherein the webpage file specifies the first and the second item for display on the webpage in adjacent display positions.

6. The method of claim 5, wherein a color in the first item is the same as a color in the second item.

7. The method of claim 1, wherein the display positions of the first item and the second item are such that (i) if both items are displayed, at least an overlapped-portion of the second item is hidden and (ii) if the first item is blocked, then the overlapped-portion of the second item is visible.

8. The method of claim 1, wherein the display positions of the first item and the second item are such that (i) if both items are displayed, then the second item is hidden and (ii) if the first item is blocked then the second item is visible.

9. The method of claim 8, wherein a display size and shape of the first item is the same as a display size and shape of the second item.

10. The method of claim 8, wherein a color in the first item is the same as a color in the second item.

11. The method of claim 8, wherein a word in the first item is the same as a word in the second item.

12. A method of providing an advertisement on a webpage comprising:
   selecting two items for display as a single advertisement at a content management system executing on a computing device, wherein a first item of the two items comprises advertising content in a first file format and a second item of the two items comprises advertising content in a second file format different from the first file format, wherein the first item and the second item are stored at different locations, wherein the first item and the second item share a common display attribute for allowing the items when displayed together to appear associated with one another, and wherein information in the webpage file specifies that the first and the second items are to be displayed in overlapping display positions on a webpage, such that the webpage has a similar formatting when the first and the second items are displayed and when one of the first and the second items are blocked by an ad-blocking application;

making the first item and the second item available to the requesting web browser from the different respective servers for displaying on the webpage; and providing, to a requesting web browser, a webpage file specifying the display of an advertisement comprising the first item and the second item such that the requesting web browser displays the webpage with one of the first and second items when the other of the first and second items is blocked by the ad-blocking application, wherein the overlapping display positions of the first and second items specified in the webpage file results in a display of the webpage having the similar formatting as if the other of the first and second items was not blocked by the ad-blocking application.

13. The method of claim 12, wherein the advertisement further comprises a third item comprising the advertising content in a third file format different from the first file format and the second file format and stored at a different location.

14. The method of claim 12, wherein the common display attribute is a common color.

15. The method of claim 12, wherein the common display attribute is a common word.

16. The method of claim 12, wherein the common display attribute is a common trademark.

17. The method of claim 12, wherein the common display attribute is a common shape.

18. The method of claim 12, wherein the common display attribute is a shared border.

19. A method of providing a webpage with hard-to-block content comprising:

receiving at a web server a request for a webpage from a requesting web browser;

generating, by a content management system executing on a computing device, a webpage file using a scheduler that selects a first item and a second item for display on the webpage, wherein the first and second items are selected based on a determination that both are associated with the same content and a determination that the first item is stored on a first server while the second item is stored on a second server different from the first server, wherein the generated webpage file specifies the first and second items by including within the webpage file: (a) either the first item or the location of the first item at the first server; and (b) either the second item or the location of the second item at the second server, and wherein information in the webpage file specifies that the first and second items are to be displayed in overlapping display positions on a webpage, such that the webpage has a similar formatting when the first and the second items are displayed and when one of the first and the second items are blocked by an ad-blocking application;

providing, to the requesting web browser, the webpage file such that when a storage location based blocking mechanism is used by the requesting web browser and the mechanism is successful in blocking display of the first item but not successful in blocking display of the second item, the webpage file instructs the requesting web browser to display the webpage with the second items, wherein the overlapping display positions of the first and second items specified in the webpage file results in a display of the webpage having a similar formatting as if the first item was not blocked by the mechanism.

20. The method of claim 19, wherein the content is an advertisement.

21. The method of claim 20, wherein the content is a non-advertisement.

22. A non-transitory computer-readable storage medium containing computer code for providing an advertisement for display on a webpage, said computer code comprising instructions for performing the steps of:

receiving a request for a webpage from a requesting web browser;

generating a webpage file using an ad scheduler that selects a first and a second advertisement items for display on the webpage, wherein the first and second items are selected based on a determination that both are associated with the same advertisement and a determination that the first item is stored in computer readable storage medium on a first server while the second item is stored in computer-readable storage medium on a second server different from the first server with both servers accessible to the requesting web browser, wherein the generated webpage file is stored in computer-readable storage medium and specifies the first and second items by including within the webpage file either the item or the location of the item on the server on which it is stored, and information in the webpage file specifies that the first and the second items are to be displayed in overlapping display positions on a webpage, such that the webpage has a similar formatting when the first and the second items are displayed and when one of the first and the second items are blocked by an ad-blocking application;

providing, to the requesting web browser, the webpage file and the first and second advertisement items such that the requesting web browser displays the webpage with the one of the first and second advertisement items when the other of the first and second advertisement items is blocked by the ad-blocking application, wherein the overlapping display positions of the first and second advertisement items specified in the webpage file results in a display of the webpage having the similar formatting as if the other of the first and second advertisement items was not blocked by the ad-blocking application.

* * * * *